United States Patent
Shintani et al.

(10) Patent No.: US 9,432,578 B2
(45) Date of Patent: Aug. 30, 2016

(54) IMAGING APPARATUS HAVING IMAGE STABILIZATION MECHANISMS

(71) Applicant: Panasonic Intellectual Property Management Co., Ltd., Osaka (JP)

(72) Inventors: Dai Shintani, Osaka (JP); Mikio Sakurai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/600,035

(22) Filed: Jan. 20, 2015

(65) Prior Publication Data

US 2015/0271410 A1    Sep. 24, 2015

(30) Foreign Application Priority Data

Mar. 24, 2014   (JP) ................................ 2014-059582
Nov. 11, 2014   (JP) ................................ 2014-228832

(51) Int. Cl.
    *H04N 5/232*    (2006.01)
(52) U.S. Cl.
    CPC ...... *H04N 5/23264* (2013.01); *H04N 5/23258* (2013.01); *H04N 5/23287* (2013.01)
(58) Field of Classification Search
    CPC .............................................. H04N 5/23264
    USPC ...................................................... 348/208.4
    See application file for complete search history.

(56) References Cited

U.S. PATENT DOCUMENTS

| | | | | |
|---|---|---|---|---|
| 2005/0140793 A1* | 6/2005 | Kojima | ............ | H04N 5/23287 348/208.99 |
| 2008/0136924 A1* | 6/2008 | Washisu | ............ | G02B 27/646 348/208.2 |
| 2010/0245603 A1* | 9/2010 | Hashi | ............ | G03B 5/00 348/208.5 |
| 2010/0254688 A1* | 10/2010 | Masuda | ............ | G03B 17/00 396/55 |
| 2011/0063458 A1* | 3/2011 | Washisu | ............ | G03B 5/00 348/208.2 |
| 2012/0020563 A1 | 1/2012 | Amir et al. | | |
| 2014/0146191 A1* | 5/2014 | Tsuchiya | ............ | G02B 27/646 348/208.2 |
| 2014/0204226 A1* | 7/2014 | Murakami | ......... | H04N 5/23287 348/208.1 |
| 2014/0327789 A1* | 11/2014 | Tsuchiya | ............ | H04N 5/23258 348/208.11 |
| 2015/0244927 A1* | 8/2015 | Laroia | ............ | H04N 5/23212 348/240.99 |
| 2016/0127649 A1* | 5/2016 | Tsuchiya | ............ | G03B 5/00 348/208.11 |

FOREIGN PATENT DOCUMENTS

| | | |
|---|---|---|
| JP | 2006-126668 | 5/2006 |
| JP | 2010-107709 | 5/2010 |
| JP | 2012-048215 | 3/2012 |

* cited by examiner

*Primary Examiner* — Roberto Velez
*Assistant Examiner* — Cynthia Segura
(74) *Attorney, Agent, or Firm* — Wenderoth, Lind & Ponack, L.L.P.

(57) ABSTRACT

An imaging apparatus includes a camera body and an interchangeable lens. The camera body includes: an image sensor; an image sensor driver configured to drive the image sensor in a plane perpendicular to an optical axis; a sensor configured to measure a position of the plane; a shake detector configured to detect a camera body shake; and a first image stabilizer configured to correct the detected shake by driving the image sensor driver. The interchangeable lens includes: an image stabilization lens configured to adjust an optical path to correct a shake; an image stabilization lens driver configured to drive the image stabilization lens in a plane perpendicular to the optical axis; and a second image stabilizer configured to correct a shake, based on a position measured by the sensor of the camera body, by driving the image stabilization lens driver.

4 Claims, 3 Drawing Sheets

IMAGING APPARATUS HAVING IMAGE STABILIZATION MECHANISMS

BACKGROUND OF THE INVENTION

1. Field of the Invention

The present disclosure relates to an imaging apparatus with an image sensor.

2. Description of the Related Art

Such imaging apparatuses have been widely used that are equipped with a mechanism which can correct blur of an optical image during shooting (hereinafter referred to as an "image stabilization mechanism") to obtain a clear shot image.

As the image stabilization mechanism, there are a lens-shift image stabilization mechanism which performs image stabilization by driving a part of or all of optical lenses in a plane perpendicular to an optical axis or in a direction tilted with respect to the optical axis, and a sensor-shift image stabilization mechanism which performs image stabilization by driving an image sensor in a plane perpendicular to the optical axis. Lens-integrated imaging apparatuses use either one of the lens-shift image stabilization mechanism and the sensor-shift image stabilization mechanism depending on the performance of the imaging apparatus. Lens-interchangeable imaging apparatuses use either the lens-shift image stabilization mechanism or the sensor-shift image stabilization mechanism depending on the design concept of a manufacturer thereof (see, for example, Unexamined Japanese Patent Publication No. 2010-107709 and Unexamined Japanese Patent Publication No. 2012-48215).

In a lens-interchangeable imaging apparatus, when both of the camera body and the interchangeable lens have respective image stabilization mechanisms, performing image stabilization operations by the two image stabilization mechanisms independently of each other may sometimes cause differences in correction operation or insufficient correction result.

SUMMARY OF THE INVENTION

In view of the above, the present disclosure is to provide a lens-interchangeable imaging apparatus which can realize effective image stabilization when both of a camera body and an interchangeable lens have respective image stabilization functions.

An imaging apparatus according to the present disclosure includes a camera body and an interchangeable lens, wherein the camera body includes: an image sensor configured to capture a subject image; an image sensor driver configured to drive the image sensor in a plane perpendicular to an optical axis; a sensor, driven integrally with the image sensor, configured to measure a position of the plane perpendicular to the optical axis; a shake detector configured to detect a shake of the camera body; and a first image stabilizer configured to correct the shake, detected by the shake detector by driving the image sensor driver, and wherein the interchangeable lens includes: an image stabilization lens configured to adjust an optical path to correct a shake; an image stabilization lens driver configured to drive the image stabilization lens in a plane perpendicular to the optical axis; and a second image stabilizer configured to correct a shake, based on a position measured by the sensor of the camera body, by driving the image stabilization lens driver.

The imaging apparatus according to the present disclosure can realize effective image stabilization when both a camera body of a lens-interchangeable imaging apparatus and an interchangeable lens have respective image stabilization functions.

DETAILED DESCRIPTION OF THE PREFERRED EMBODIMENT

Hereinafter, an exemplary embodiment will be described with reference to the accompanying drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

Also, it should be noted that the following description and the accompanying drawings are provided to allow any person skilled in the art to fully understand the present disclosure, and that it is not intended to limit the subject matter described in the claims by the following description.

Exemplary Embodiment

Hereinafter, an exemplary embodiment will be described with reference to FIG. 1 to FIG. 3.

1. Configuration 1-1. Configuration of Imaging Apparatus

Figure 1:
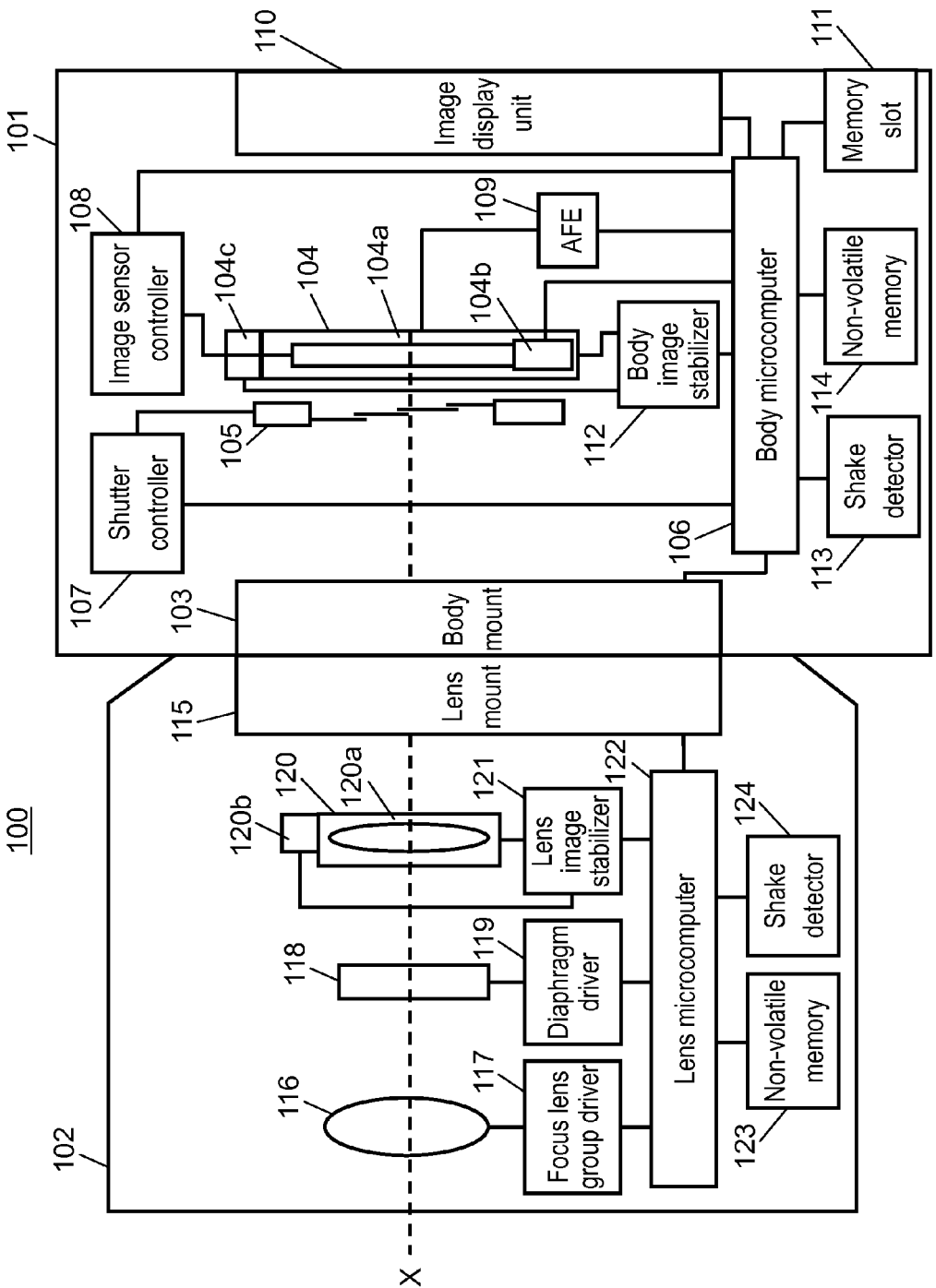
FIG. 1 is a schematic configuration diagram of an imaging apparatus in accordance with an exemplary embodiment.
Figure 2:
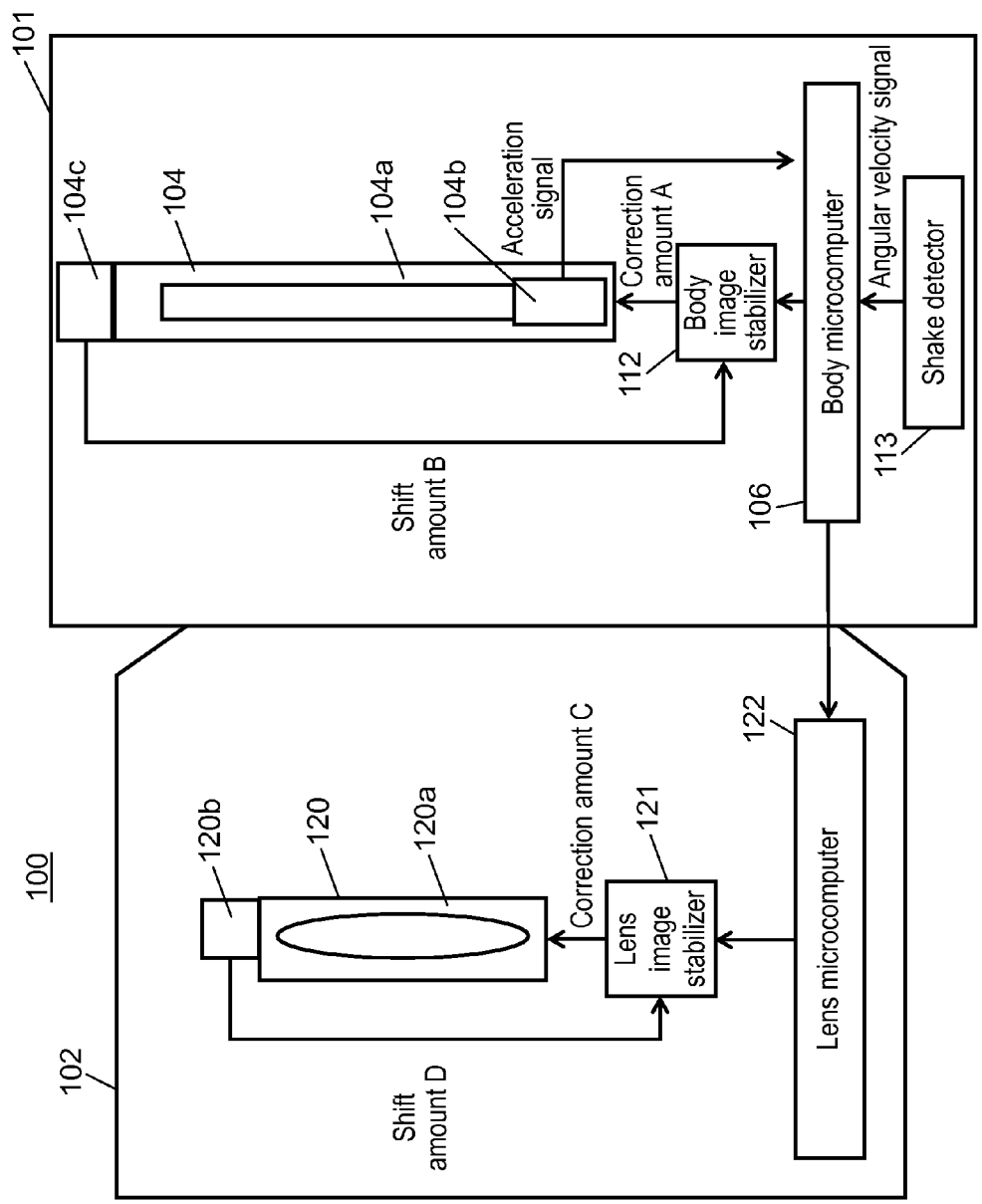
FIG. 2 is a diagram mainly extracting a configuration related to an image stabilization operation in the imaging apparatus shown in FIG. 1.

FIG. 1 is a schematic configuration diagram of imaging apparatus 100 in accordance with an exemplary embodiment. Imaging apparatus 100 is a lens-interchangeable digital camera.

Imaging apparatus 100 includes camera body 101, and interchangeable lens 102. Interchangeable lens 102 can be detachably attached to camera body 101.

Camera body 101 includes body mount 103, image sensor 104, shutter unit 105, body microcomputer 106, shutter controller 107, image sensor controller 108, analog front end (AFE) 109, image display unit 110, memory slot 111, body image stabilizer 112, shake detector 113, and non-volatile memory 114.

Interchangeable lens 102 forms an optical image of a subject on image sensor 104 of camera body 101. Interchangeable lens 102 includes lens mount 115, focus lens group 116, focus lens group driver 117, diaphragm 118, diaphragm driver 119, image stabilization lens 120, lens image stabilizer 121, lens microcomputer 122, non-volatile memory 123, and shake detector 124.

1-2. Configuration of Camera Body

First, a configuration of camera body 101 will be described.

Body mount 103 is a connecting member for mechanically and electrically connecting camera body 101 and interchangeable lens 102 in combination with lens mount 115 of interchangeable lens 102. When camera body 101 and interchangeable lens 102 are mechanically and electrically connected to each other, communications become possible between body microcomputer 106 and lens microcomputer 122. Body mount 103 notifies lens microcomputer 122 through lens mount 115 of exposure synchronizing signal and other control signals received from body microcomputer 106. Also, body mount 103 notifies body microcomputer 106 of signals received from lens microcomputer 122 through lens mount 115.

Image sensor 104 captures a subject image incident thereon through interchangeable lens 102 to produce image data. The produced image data are converted from analog-form data to digital-form data in AFE 109. The image data converted to digital-form data in AFE 109 are subjected to various signal processing in body microcomputer 106. The various image processing includes, for example, gamma correction, white balance correction, flaw correction, RGB to YUV conversion, electronic zoom, image compression, still image file creation, and motion picture file creation.

Image sensor 104 uses a charge coupled device (CCD) image sensor or a complementary metal-oxide semiconductor (CMOS) image sensor, for example.

Image sensor 104 includes image sensor driver 104a for driving image sensor 104 in a plane perpendicular to optical axis x, acceleration sensor 104b driven integrally with image sensor 104, shift amount detector 104c for detecting a shift amount of image sensor 104. In the present exemplary embodiment, acceleration sensor 104b has two acceleration sensors for detecting accelerations in two directions, i.e., in a horizontal direction and a vertical direction on the plane perpendicular to optical axis x. Acceleration signals detected by acceleration sensor 104b are sent to body microcomputer 106. Shift amount detector 104c detects an actual shift amount of image sensor 104.

Body image stabilizer 112 performs a control to drive image sensor 104, and operates in combination with shift amount detector 104c so as to form a feedback control loop for performing a control to drive image sensor 104.

Shake detector 113 has an angular velocity sensor which detects a movement of camera body 101 caused by a camera shake or the like. This angular velocity sensor outputs to body microcomputer 106 an angular velocity signal which is positive or negative relative to a reference depending on a moving direction of camera body 101, where the reference is an output of the angular velocity sensor when camera body 101 remains stationary. In the present exemplary embodiment, two angular velocity sensors are provided to respectively detect angular velocities in two directions—a yawing direction and a pitching direction.

Image sensor controller 108 controls an operation of image sensor 104 based on a control signal from body microcomputer 106.

Shutter unit 105 is disposed on the subject side relative to image sensor 104 to adjust exposure condition of image sensor 104. Shutter unit 105 blocks or passes light from a subject entered through interchangeable lens 102 to adjust a time to expose image sensor 104. Shutter unit 105 is, for example, a focal-plane shutter having a curtain.

Shutter controller 107 performs a control to drive shutter unit 105 based on a control signal from body microcomputer 106.

A memory not shown in the figure is detachably attached to memory slot 111. Body microcomputer 106 reads out data such as image data or motion picture data recorded in the memory attached to memory slot 111. Also, body microcomputer 106 records produced data such as image data or motion picture data into the memory attached to memory slot 111. The memory attached to memory slot 111 may, for example, be a card type recording medium.

Incidentally, non-volatile memory 114 may be used in place of the memory attached to memory slot 111.

Image display unit 110 displays image data as a visible image. Also, image display unit 110 displays a live-view image. Further, image display unit 110 displays various kinds of information such as states of camera body 101 and shooting conditions. The live-view image is an image captured by image sensor 104 and sequentially displayed on image display unit 110. In other words, the live-view image is an almost real-time motion picture of a subject.

Body microcomputer 106 controls the entire camera body 101 and various sequences. Body microcomputer 106 includes such components, for example, as a central processing unit (CPU), a read-only memory (ROM), and a random access memory (RAM), and can realize various functions by loading programs stored in the ROM into the CPU. The functions realized by body microcomputer 106 include, for example, a function of detecting that interchangeable lens 102 has been attached to camera body 101, and a function of setting an image stabilization function to be in an image stabilization enabled condition or an image stabilization disabled condition. Body microcomputer 106 is connected to each of structural components provided in camera body 101. Also, body microcomputer 106 performs image processing for processing the image data.

Also, camera body 101 is provided with a power supply switch, not shown in the figure, for turning on or off a power supply of imaging apparatus 100, and a release button, not shown in the figure, operated by a user at the time of focusing or releasing. When the power supply is turned on by the power supply switch, power is supplied to each of the structural components of camera body 101 and interchangeable lens 102.

Non-volatile memory 114 has stored therein camera body information including various kinds of information regarding camera body 101. The camera body information includes: model information for identifying camera body 101 such as manufacturer name, manufactured date, model number, version of software installed in body microcomputer 106, and information regarding firmware update; information whether or not camera body 101 has an image stabilization function; information regarding detection performance such as sensitivity; and error history. The camera body information may be stored in a memory provided in body microcomputer 106 in place of non-volatile memory 114.

1-3. Configuration of Interchangeable Lens

Next, a configuration of interchangeable lens 102 will be described.

Lens mount 115 is fitted to body mount 103 of camera body 101 to attach interchangeable lens 102 to camera body 101. Lens mount 115 is a connecting member for mechanically and electrically connecting interchangeable lens 102 and camera body 101 to each other in combination with body mount 103. When interchangeable lens 102 and camera body 101 are mechanically and electrically connected to each other, communications become possible between lens microcomputer 122 and body microcomputer 106. Lens mount 115 notifies body microcomputer 106 of a signal received from lens microcomputer 122. Also, Lens mount 115 notifies lens microcomputer 122 of an exposure synchronizing signal and other control signals received from body microcomputer 106 through body mount 103.

Focus lens group 116 includes a plurality of lenses to adjust focus. Focus lens group 116 is movable along an optical axis direction in a range from a nearest focus position to an infinite focus position specified as a standard for interchangeable lens 102.

Focus lens group driver 117 drives focus lens group 116 according to a user's operation of imaging apparatus 100 or a control signal from body microcomputer 106 of camera body 101.

Diaphragm 118 adjusts the amount of light passed through focus lens group 116 and incident on image sensor 104 of camera body 101. Diaphragm 118 is driven by diaphragm driver 119.

Diaphragm driver 119 drives diaphragm 118 according to a control signal from body microcomputer 106 of camera body 101.

Image stabilization lens 120 is a lens for correcting blur of image by adjusting an optical path. Image stabilization lens 120 includes image stabilization lens driver 120a for driving image stabilization lens 120 in a plane perpendicular to optical axis x, and shift amount detector 120b for detecting an actual shift amount of image stabilization lens 120.

Lens image stabilizer 121 performs a control to drive image stabilization lens 120, and forms, in conjunction with shift amount detector 120b, a feedback control loop for performing a control to drive image stabilization lens 120.

Lens microcomputer 122 controls the entire interchangeable lens 102, and is connected to each of structural components of interchangeable lens 102. Lens microcomputer 122 includes such components, for example, as a CPU, a ROM, and a RAM, and can realize various functions by loading programs stored in the ROM into the CPU. For example, lens microcomputer 122 has a function of setting an image stabilization function to be in an image stabilization enabled condition or in an image stabilization disabled condition based on a control signal from body microcomputer 106.

Non-volatile memory 123 has stored therein lens information including various kinds of information regarding interchangeable lens 102. The lens information includes: model information for identifying interchangeable lens 102 such as manufacturer name, manufactured date, model number of interchangeable lens 102, version of software installed in lens microcomputer 122, and information regarding firmware update; and information whether or not interchangeable lens 102 has an image stabilization function. In the case where interchangeable lens 102 has an image stabilization function, the lens information includes information regarding a model number of shake detector 124 and a detection performance thereof such as sensitivity, information regarding a model number of lens image stabilizer 121 and a correction performance thereof such as maximum correctable angle, and version of software performing the image stabilization. The lens information further includes information regarding power consumption necessary to drive lens image stabilizer 121, and information regarding a drive system of lens image stabilizer 121. Furthermore, non-volatile memory 123 may also store information sent from body microcomputer 106.

Incidentally, the lens information may be stored in a memory provided in lens microcomputer 122 instead of non-volatile memory 123.

Shake detector 124 includes an angular velocity sensor which detects a movement of interchangeable lens 102 caused, for example, by a camera shake. This angular velocity sensor outputs an angular velocity signal which is positive or negative relative to a reference depending on a moving direction of interchangeable lens 102, where the reference is an output of the angular velocity sensor when interchangeable lens 102 is stationary. Two angular velocity sensors are provided to respectively detect angular velocities in two directions—a yawing direction and a pitching direction. Angular velocity signals output by the angular velocity sensors are sent to lens microcomputer 122. Shake detector 124 is used when interchangeable lens 102 independently performs an image stabilization operation, and is not used for an image stabilization operation in accordance with the present exemplary embodiment.

2. Image Stabilization Operation

An image stabilization operation of imaging apparatus 100 in accordance with the exemplary embodiment will be described. FIG. 2 is a diagram mainly extracting a configuration related to an image stabilization operation in imaging apparatus 100 shown in FIG. 1.

The image stabilization operation in the present exemplary embodiment is controlled by body microcomputer 106 of camera body 101. To perform the image stabilization operation, body microcomputer 106 notifies lens microcomputer 122 of a start of the image stabilization operation, and instructs interchangeable lens 102 not to independently perform an image stabilization operation.

Shake detector 113 of camera body 101 detects a camera shake caused on imaging apparatus 100. The camera shake is detected as two-directional angular velocity signals in a yawing direction and a pitching direction. Shake detector 113 notifies body microcomputer 106 of the detected two-directional angular velocity signals. Body microcomputer 106 sends the notified two-directional angular velocity signals to body image stabilizer 112, and controls body image stabilizer 112 to calculate a shake correction amount. Body image stabilizer 112 calculates shake "correction amount A" based on the two-directional angular velocity signals, and notifies image sensor driver 104a of "correction amount A".

Image sensor driver 104a drives image sensor 104 to correct a shake based on the notified "correction amount A".

Shift amount detector 104c checks whether or not correction of full "correction amount A" has been successfully completed by the correction-drive by image sensor driver 104a. Shift amount detector 104c detects actual "shift amount B" of image sensor 104. If the detected "shift amount B" is equal to "correction amount A", the image stabilization operation is completed. If, on the other hand, the detected "shift amount B" is not equal to "correction amount A", shift amount detector 104c notifies body image stabilizer 112 of "shift amount B", and body image stabilizer 112 notifies image sensor driver 104a of "remaining correction amount C" so that image sensor driver 104a drives image sensor 104 to correct a shift corresponding to "remaining correction amount C". However, it takes time for correction if feedback is performed by the feedback control loop.

Accordingly, correction of "remaining correction amount C" is performed at the side of interchangeable lens 102 by using acceleration sensor 104b, without waiting for a feedback of the feedback control loop.

Figure 3:
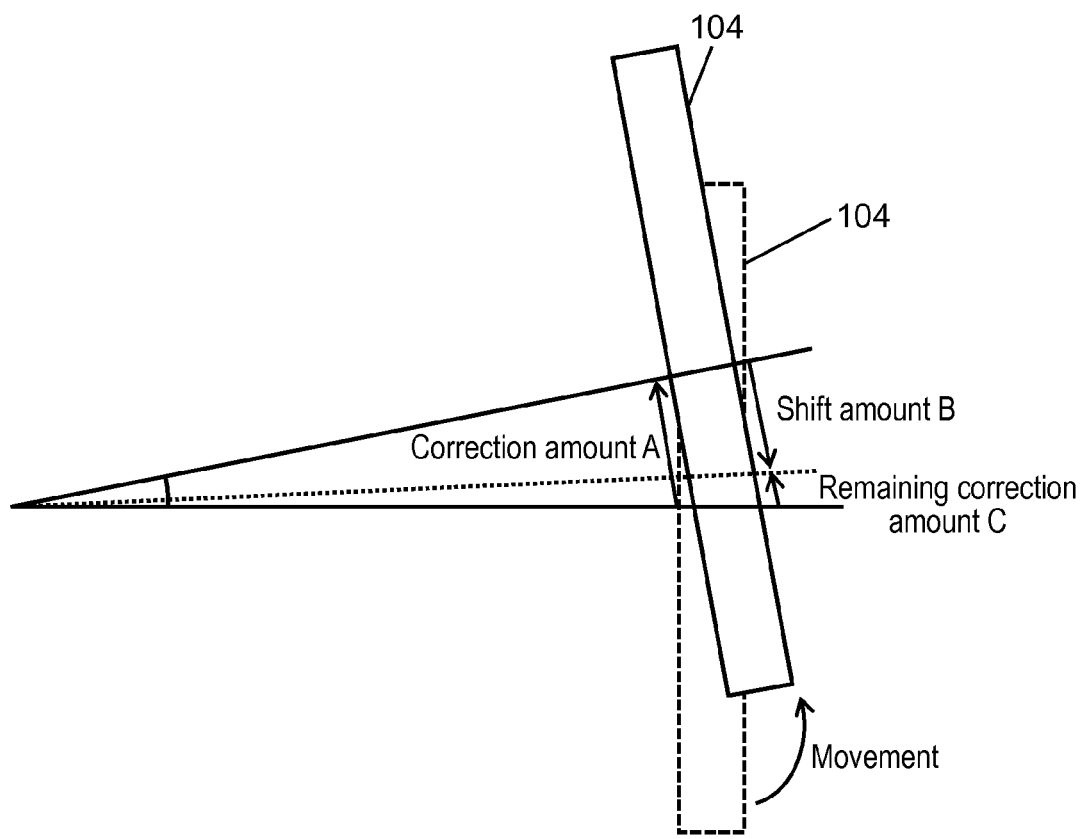
FIG. 3 is a diagram for explaining an image stabilization operation in accordance with the exemplary embodiment.

FIG. 3 is a diagram for explaining an image stabilization operation in accordance with the present exemplary embodiment. Referring to FIG. 3, it is assumed that image sensor 104 has shifted from a position indicated by a broken line to a position indicated by a solid line. The amount for correcting a shake caused by this shift is "correction amount A". After correction of the image sensor 104 by image sensor driver 104a, there remains an uncorrected shift corresponding to "remaining correction amount C", which is a difference obtained by subtracting actual "shift amount B" detected by shift amount detector 104c from "correction amount A".

"Correction amount A" has been calculated by detecting shakes in two rotational directions by two angular velocity sensors. If "remaining correction amount C" is detected in the same way by the two angular velocity sensors of shake detector 113, rotation angles of the respective detecting angular velocity sensors are adequately small so that their respective movements can be approximated to one-directional translational motions. Accordingly, a remaining shake of imaging apparatus 100 is measured by using acceleration sensor 104b. The shakes are detected as acceleration signals indicating the respective translational motions in the vertical direction and the horizontal direction. The detected acceleration signals are notified to body microcomputer 106. Body microcomputer 106 having been notified of the acceleration signals in turn notifies lens microcomputer 122 of the acceleration signals.

Lens microcomputer 122 sends the notified acceleration signals to lens image stabilizer 121, and controls lens image stabilizer 121 to calculate a shake correction amount. Lens image stabilizer 121 calculates "remaining correction amount C" based on the acceleration signals, and notifies image stabilization lens driver 120a of the calculated "remaining correction amount C".

Image stabilization lens driver 120a drives image stabilization lens 120 to correct a shake based on the notified "remaining correction amount C".

Shift amount detector 120b confirms whether or not correction of full "remaining correction amount C" has been successfully completed by the correction-drive by image stabilization lens driver 120a. Shift amount detector 120b detects actual "shift amount D" of image stabilization lens 120. If the detected "shift amount D" is equal to "remaining correction amount C", the image stabilization operation is completed. If, on the other hand, the detected "shift amount D" is not equal to "remaining correction amount C", shift amount detector 120b notifies lens image stabilizer 121 of "shift amount D", and lens image stabilizer 121 notifies image stabilization lens driver 120a of a remaining correction amount so that image stabilization lens driver 120a drives image stabilization lens 120 to correct a shift corresponding to the remaining correction amount. In this manner, image stabilization is performed by the feedback control loop.

Although "remaining correction amount C" is calculated by lens microcomputer 122 in the present exemplary embodiment, "remaining correction amount C" may be calculated by body microcomputer 106 and the calculation result may be sent to lens microcomputer 122.

Although "remaining correction amount C" is calculated by using acceleration sensors in the present exemplary embodiment, sensors may not be limited to acceleration sensors. Other sensors may be used as far as they can measure translational motions.

Although an acceleration sensor is used as a sensor driven integrally with the image sensor for measuring a position of a plane perpendicular to the optical axis in the present exemplary embodiment, the sensor may not be limited to the acceleration sensor. The position of the plane may be detected by using an image in place of an acceleration sensor, or by a combination of an acceleration sensor and an image, or by any other detection method.

3. Advantageous Effects

In the present exemplary embodiment, as described hereinabove, an imaging apparatus includes a camera body and an interchangeable lens. The camera body includes: an image sensor for capturing a subject image; an image sensor driver configured to drive the image sensor in a plane perpendicular to an optical axis; a sensor, driven integrally with the image sensor, configured to measure a position of the plane perpendicular to the optical axis; a shake detector configured to detect a shake of the camera body; and a first image stabilizer configured to correct the shake, detected by the shake detector, by driving the image sensor driver. The interchangeable lens includes: an image stabilization lens configured to adjust an optical path to correct a shake; an image stabilization lens driver configured to drive the image stabilization lens in a plane perpendicular to the optical axis; and a second image stabilizer configured to correct a shake, based on a position measured by the sensor of the camera body, by driving the image stabilization lens driver.

The imaging apparatus according to the present disclosure configured as above can realize effective image stabilization when both a camera body of a lens-interchangeable imaging apparatus and an interchangeable lens have image stabilization functions.

Further, in the present exemplary embodiment, the sensor of the imaging apparatus is an acceleration sensor, and the shake detector is an angular velocity sensor configured to detect an angular velocity of the camera body.

With this configuration, it is possible to detect translational shakes in a horizontal direction and a vertical direction, which cannot be detected by the shake detector of the camera body. Accordingly, image stabilization is possible not only in a rotational direction, but also in translational directions.

What is claimed is:

1. An imaging apparatus comprising:
   a camera body; and
   an interchangeable lens,
   wherein the camera body includes:
      an image sensor configured to capture a subject image;
      an image sensor driver configured to drive the image sensor in a plane perpendicular to an optical axis;
      a translational motion sensor, driven integrally with the image sensor, and configured to measure a translational motion of the image sensor in the plane perpendicular to the optical axis;
      a shift amount detector configured to measure a shift amount of the image sensor;
      a shake detector configured to detect a shake of the camera body; and
      a first image stabilizer configured to correct the shake, detected by the shake detector, by driving the image sensor driver, and
   wherein the interchangeable lens includes:
      an image stabilization lens configured to adjust an optical path to correct a shake;
      an image stabilization lens driver configured to drive the image stabilization lens in the plane perpendicular to the optical axis; and
      a second image stabilizer configured to correct a shake by driving the image stabilization lens driver, so as to counteract the translational motion of the image sensor, that is measured by the translational motion sensor.

2. The imaging apparatus according to claim 1, wherein:
   the translational motion sensor is an acceleration sensor configured to measure an acceleration of the image sensor in the plane perpendicular to the optical axis, and the shake detector is an angular velocity sensor configured to measure an angular velocity of the camera body.

3. The imaging apparatus according to claim 2, further comprising:
   a body microcomputer in the camera body configured to notify the acceleration measured by the acceleration sensor to a lens microcomputer in the interchangeable lens;
   wherein the first image stabilizer in the camera body is configured to drive the image sensor driver based on the angular velocity measured by the shake detector; and
   wherein the second image stabilizer in the interchangeable lens is configured to drive the image stabilization lens driver based on the acceleration notified from the body microcomputer.

4. An imaging apparatus comprising:
   a camera body; and
   an interchangeable lens,
   wherein the camera body includes:
      an image sensor configured to capture a subject image;
      an image sensor driver configured to drive the image sensor in a plane perpendicular to an optical axis;
      a translational motion sensor, driven integrally with the image sensor, and configured to measure a translational motion of the image sensor in the plane perpendicular to the optical axis;
      a shake detector configured to detect a shake of the camera body; and
      a first image stabilizer configured to correct the shake, detected by the shake detector, by driving the image sensor driver, and
   wherein the interchangeable lens includes:
      an image stabilization lens configured to adjust an optical path to correct a shake;
      an image stabilization lens driver configured to drive the image stabilization lens in the plane perpendicular to the optical axis; and
      a second image stabilizer configured to correct a shake by driving the image stabilization lens driver, so as to counteract the translational motion of the image sensor, that is measured by the translational motion sensor; and
   wherein the translational motion of the image sensor measured by the translational motion sensor corresponds to a subtraction of a driving amount driven by the image sensor driver from the shake detected by the shake detector.

* * * * *